(12) United States Patent
Shinbashi et al.

(10) Patent No.: US 8,583,985 B2
(45) Date of Patent: Nov. 12, 2013

(54) TRANSMISSION APPARATUS, TRANSMISSION METHOD, RECEPTION APPARATUS, RECEPTION METHOD, PROGRAM AND TRANSMISSION SYSTEM

(75) Inventors: Tatsuo Shinbashi, Tokyo (JP); Kazuhisa Funamoto, Kanagawa (JP); Hideyuki Matsumoto, Tokyo (JP); Hiroshi Shiroshita, Kanagawa (JP); Kenichi Maruko, Kanagawa (JP); Tatsuya Sugioka, Tokyo (JP); Naohiro Koshisaka, Hokkaido (JP)

(73) Assignee: Sony Corporation, Tokyo (JP)

( * ) Notice: Subject to any disclaimer, the term of this patent is extended or adjusted under 35 U.S.C. 154(b) by 148 days.

(21) Appl. No.: 13/253,464

(22) Filed: Oct. 5, 2011

(65) Prior Publication Data

US 2012/0131412 A1 May 24, 2012

(30) Foreign Application Priority Data

Nov. 19, 2010 (JP) ................................. 2010-258570

(51) Int. Cl.
*H03M 13/00* (2006.01)
(52) U.S. Cl.
USPC .......................................... 714/758; 714/752
(58) Field of Classification Search
USPC .................................................. 714/752, 758
See application file for complete search history.

(56) References Cited

U.S. PATENT DOCUMENTS 3,311,878 A * 3/1967 Melas ............................ 714/801
2009/0116839 A1* 5/2009 Kikuchi et al. ................. 398/79

OTHER PUBLICATIONS

Serial ATA: "High Speed Serialized AT Attachment", Revision 1.0a, Jan. 7, 2003, 311 pages.
U.S. Appl. No. 13/247,161, filed Sep. 28, 2011, Shinbashi, et al.
U.S. Appl. No. 13/765,963, filed Feb. 13, 2013, Matsumoto, et al.

* cited by examiner

*Primary Examiner* — Sam Rizk
(74) *Attorney, Agent, or Firm* — Sony Corporation

(57) ABSTRACT

A transmission apparatus, including an error correction code calculation section adapted to calculate an error correction code from data of a transmission object as an information word is disclosed. The transmission apparatus further includes a division section adapted to allocate coded data which configures a codeword obtained by adding the error correction code determined by the calculation by the error correction code calculation section to the data of the transmission object for each predetermined number of units to a plurality of transmission lines. The transmission apparatus further includes a plurality of transmission sections provided corresponding to the plural transmission lines and adapted to transmit the coded data allocated by the division section to a reception apparatus through the transmission lines.

20 Claims, 11 Drawing Sheets

F I G . 4
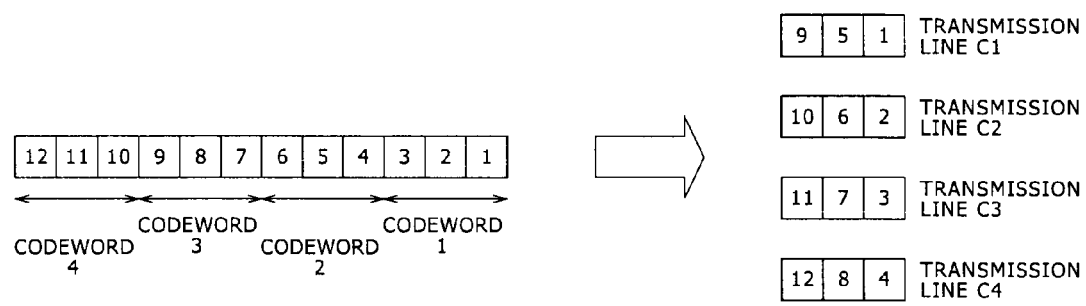

TRANSMISSION APPARATUS, TRANSMISSION METHOD, RECEPTION APPARATUS, RECEPTION METHOD, PROGRAM AND TRANSMISSION SYSTEM

BACKGROUND

This disclosure relates to a transmission apparatus, a transmission method, a reception apparatus, a reception method, a program and a transmission system.

Together with increase of the amount of information, increase of the transmission speed of an interface between signal processing LSIs (Large Scale Integrated Circuits) is demanded.

In order to satisfy the demand, such techniques as multi-parallelization of signal processing, increase of the clock frequency of an interface, reduction of the voltage of a signal and so forth are adopted. However, with the techniques just described, the noise resisting property degrades, resulting in difficulty to correctly transmit data.

Also in an interface with regard to which it is demanded to suppress the power consumption such as an interface between signal processing LSIs for a mobile apparatus, while increase of the transmission speed is not required so much, reduction of the voltage is advanced and it is difficult to correctly transmit data.

In order to solve such problems as described above, electric performance improvement of a transmission channel such as improvement in performance of a CDR (Clock Data Recovery) circuit or an equalizer has been made and also an error correction code for correcting an error caused by noise by the reception side is used. As an error correction code, the Reed-Solomon code or a like code is available. In an LSI on the reception side, a decoding process of the error correction code can be carried out to correct errors of data to some degree.
Serial ATA: High Speed Serialized AT Attachment Revision 1.0a 7 Jan. 2003 is listed as a related-art Non-Patent Document.

SUMMARY

In an ordinary interface between LSIs, even if a plurality of transmission lines are used between LSIs, data of one codeword configured from transmission data having an error correction code added thereto is transmitted usually using the single same transmission path. Accordingly, if a number of bit errors exceeding the correction capacity, which depends upon the number of bits of the error correction code, appear in one codeword, then the errors cannot be corrected, resulting in loss of the data. Depending upon a system, failure in correction is detected and re-sending of data is carried out.

The transmission capacity demanded for an interface between signal processing LSIs is increasing at an accelerated pace, and this makes a transmission error likely to occur and makes it difficult to assure a transmission band sufficient to re-send data.

Therefore, it is desirable to provide a transmission apparatus, a transmission method, a reception apparatus, a reception method, a program and a transmission system which can enhance the error correction capacity while the transmission speed of data is raised.

According to a first embodiment of the disclosed technology, there is provided a transmission apparatus including an error correction code calculation section adapted to calculate an error correction code from data of a transmission object as an information word, a division section adapted to allocate coded data which configure a codeword obtained by adding the error correction code determined by the calculation by the error correction code calculation section to the data of the transmission object for each predetermined number of units to a plurality of transmission lines, and a plurality of transmission sections provided corresponding to the plural transmission lines and adapted to transmit the coded data allocated by the division section to a reception apparatus through the transmission lines.

The transmission apparatus may be configured such that the division section allocates padding data having a predetermined value to any of the transmission lines to which the coded data are allocated by a smaller amount than the other transmission lines so that an amount of the coded data equal to the allocation amount of the coded data to the other transmission lines is allocated, and the transmission section provided corresponding to the transmission line to which the padding data is allocated transmits the padding data next to the coded data.

In this instance, the division section may allocate the coded data which configure the same codeword to different ones of the transmission lines in an order in which the coded data are supplied from the error correction code calculation section.

According to the first embodiment of the disclosed technology, also there is provided a transmission method including calculating, by an error correction code calculation section, an error correction code from data of a transmission object as an information word, allocating, by a division section, coded data which configure a codeword obtained by adding the error correction code determined by the calculation by the error correction code calculation section to the data of the transmission object for each predetermined number of units to a plurality of transmission lines, and transmitting, by a plurality of transmission sections provided corresponding to the plural transmission lines, the coded data allocated by the division section to a reception apparatus through the transmission lines.

According to the first embodiment of the disclosed technology, there is further provided a program for causing a computer to execute a process including calculating, by an error correction code calculation section, an error correction code from data of a transmission object as an information word, allocating, by a division section, coded data which configure a codeword obtained by adding the error correction code determined by the calculation by the error correction code calculation section to the data of the transmission object for each predetermined number of units to a plurality of transmission lines, and transmitting, by a plurality of transmission sections provided corresponding to the plural transmission lines, the coded data allocated by the division section to a reception apparatus through the transmission lines.

According to a second embodiment of the disclosed technology, there is provided a reception apparatus including a plurality of reception sections provided corresponding to a plurality of transmission lines and adapted to receive coded data transmitted from a transmission apparatus which calculates an error correction code from data of a transmission object as an information word, allocates coded data which configure a codeword obtained by adding the error correction code determined by the calculation to the data of the transmission object for each predetermined number of units to a plurality of transmission lines, and transmits the coded data allocated to the transmission lines, a coupling section adapted to produce a codeword based on the coded data received by the plural reception sections, and an error correction section adapted to carry out error correction of the data of the transmission object based on the error correction code included in the codeword produced by the coupling section.

The reception apparatus may be configured such that, in the case where padding data having a predetermined value is allocated by the transmission apparatus to any of the transmission lines to which the coded data are allocated by a smaller amount than the other transmission lines so that an amount of the coded data equal to the allocation amount of the coded data to the other transmission lines is allocated and the padding data is received by that one of the reception sections which corresponds to the transmission line to which the padding data is allocated, the coupling section removes the padding data.

According to the second embodiment, also there is provided a reception method including receiving, by a plurality of reception sections provided corresponding to a plurality of transmission lines, coded data transmitted from a transmission apparatus which calculates an error correction code from data of a transmission object as an information word, allocates coded data which configure a codeword obtained by adding the error correction code determined by the calculation to the data of the transmission object for each predetermined number of units to a plurality of transmission lines, and transmits the coded data allocated to the transmission lines, producing, by a coupling section, a codeword based on the coded data received by the plural reception sections, and carrying out, by an error correction section, error correction of the data of the transmission object based on the error correction code included in the codeword produced by the coupling section.

According to the second embodiment, there is further provided a program for causing a computer to execute a process including receiving, by a plurality of reception sections provided corresponding to a plurality of transmission lines, coded data transmitted from a transmission apparatus which calculates an error correction code from data of a transmission object as an information word, allocates coded data which configure a codeword obtained by adding the error correction code determined by the calculation to the data of the transmission object for each predetermined number of units to a plurality of transmission lines, and transmits the coded data allocated to the transmission lines, producing, by a coupling section, a codeword based on the coded data received by the plural reception sections, and carrying out, by an error correction section, error correction of the data of the transmission object based on the error correction code included in the codeword produced by the coupling section.

According to a third embodiment of the disclosed technology, there is provided a transmission system including a transmission apparatus and a reception apparatus. The transmission apparatus includes an error correction code calculation section adapted to calculate an error correction code from data of a transmission object as an information word, a division section adapted to allocate coded data which configure a codeword obtained by adding the error correction code determined by the calculation by the error correction code calculation section to the data of the transmission object for each predetermined number of units to a plurality of transmission lines, and a plurality of transmission sections provided corresponding to the plural transmission lines and adapted to transmit the coded data allocated by the division section to the reception apparatus through the transmission lines. The reception apparatus includes a plurality of reception sections provided corresponding to the transmission lines and adapted to receive the coded data transmitted from the transmission apparatus, a coupling section adapted to produce a codeword based on the coded data received by the plural reception sections, and an error correction section adapted to carry out error correction of the data of the transmission object based on the error correction code included in the codeword produced by the coupling section.

In the first embodiment of the disclosed technology, the error correction code calculation section calculates an error correction code from data of a transmission object as an information word. The division section allocates coded data which configure a codeword obtained by adding the error correction code determined by the calculation by the error correction code calculation section to the data of the transmission object for each predetermined number of units to the plural transmission lines. Then, the plural transmission sections provided corresponding to the plural transmission lines transmit the coded data allocated by the division section to the reception apparatus through the transmission lines.

In the second embodiment of the disclosed technology, the plural reception sections provided corresponding to the plural transmission lines receive coded data transmitted from the transmission apparatus which calculates an error correction code from data of a transmission object as an information word, allocates coded data which configure a codeword obtained by adding the error correction code determined by the calculation to the data of the transmission object for each predetermined number of units to a plurality of transmission lines, and transmits the coded data allocated to the transmission lines. Then, the coupling section produces a codeword based on the coded data received by the plural reception sections. Then, the error correction section carries out error correction of the data of the transmission object based on the error correction code included in the codeword produced by the coupling section.

In the third embodiment of the disclosed technology, the transmission apparatus calculates an error correction code from data of a transmission object as an information word, and allocates coded data which configure a codeword obtained by adding the error correction code determined by the calculation to the data of the transmission object for each predetermined number of units to the plural transmission lines. Further, the transmission apparatus transmits, by the plural transmission sections provided corresponding to the plural transmission lines, the allocated coded data to the reception apparatus through the transmission lines. Meanwhile, the reception apparatus receives, by the plural reception sections provided corresponding to the transmission lines, the coded data transmitted from the transmission apparatus. Then, the reception apparatus produces a codeword based on the coded data received by the plural reception sections, and carries out error correction of the data of the transmission object based on the error correction code included in the produced codeword.

In summary, with the transmission apparatus, transmission method, reception apparatus, reception method, program and transmission system, the error correction capacity can be enhanced while the transmission speed of data is raised.

BRIEF DESCRIPTION OF THE DRAWINGS

FIG. 4 is a diagrammatic view illustrating an example of transmission line division of transmission data;

DETAILED DESCRIPTION OF THE PREFERRED EMBODIMENTS

Configuration of Blocks

Figure 1:
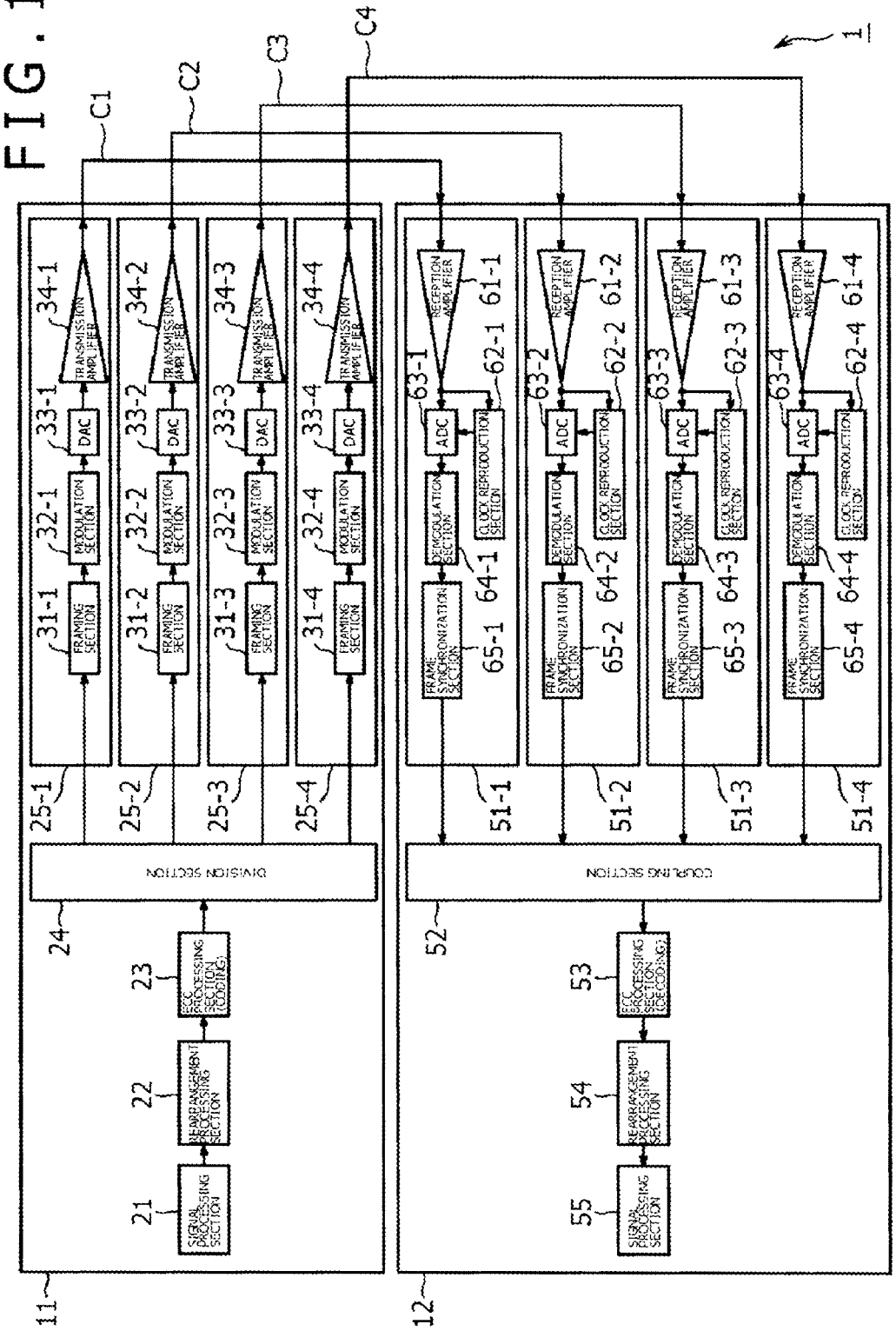
FIG. 1 is a block diagram showing an example of a configuration of a transmission system.

FIG. 1 shows an example of a configuration of a transmission system according to an embodiment of the technology disclosed herein.

Referring to FIG. 1, the transmission system 1 shown includes a transmission side block 11 and a reception side block 12. The transmission side block 11 and the reception side block 12 are implemented, for example, by LSIs different from each other or by the same LSI and are provided in the same apparatus wherein information is processed such as a digital camera, a portable telephone set or a personal computer.

In the example of FIG. 1, the transmission side block 11 and the reception side block 12 are connected to each other by four transmission lines C1 to C4. The transmission lines C1 to C4 may be wire transmission lines or wireless transmission lines. Further, the number of transmission lines between the transmission side block 11 and the reception side block 12 may be five or more.

Configuration of Transmission Side Block

First, a configuration of the transmission side block 11 is described. The transmission side block 11 includes a signal processing section 21, a rearrangement processing section 22, an ECC (Error Correcting Code) processing section 23, a division section 24, and transmission processing sections 25-1 to 25-4.

The transmission processing section 25-1 includes a framing section 31-1, a modulation section 32-1, a DAC (Digital Analog Converter) 33-1 and a transmission amplifier 34-1, and the transmission processing section 25-2 includes a framing section 31-2, a modulation section 32-2, a DAC 33-2 and a transmission amplifier 34-2. The transmission processing section 25-3 includes a framing section 31-3, a modulation section 32-3, a DAC 33-3 and a transmission amplifier 34-3, and the transmission processing section 25-4 includes a framing section 31-4, a modulation section 32-4, a DAC 33-4 and a transmission amplifier 34-4.

In this manner, if it is determined that a configuration nearer to the transmission lines is a lower order configuration, then in the transmission side block 11, the division section 24 is provided at a position lower than the ECC processing section 23. Further, at a position lower than the division section 24, a transmission processing section including a framing section, a modulation section, a DAC and a transmission amplifier is provided corresponding to each of the transmission lines C1 to C4.

The signal processing section 21 carries out various signal processing and outputs transmission data which are data of a transmission object such as image data, text data and audio data obtained by carrying out the signal processing to the rearrangement processing section 22.

Also, it is possible to use a different configuration wherein transmission data are inputted from an external circuit of the transmission side block 11 to the rearrangement processing section 22. For example, pixel data which configure an image picked up by an external image pickup device such as, for example, a CMOS (Complementary Metal Oxide Semiconductor) image pickup device may be inputted as transmission data in order one by one pixel data.

The rearrangement processing section 22 acquires the transmission data supplied thereto from the signal processing section 21 and carries out rearrangement of the acquired transmission data. For example, in the case where the transmission data are data whose symbol is configured from a predetermined number of bits such as 12 bits, the rearrangement processing section 22 carries out rearrangement of the data to convert the data into data of a unit of 8 bits.

Figure 2:
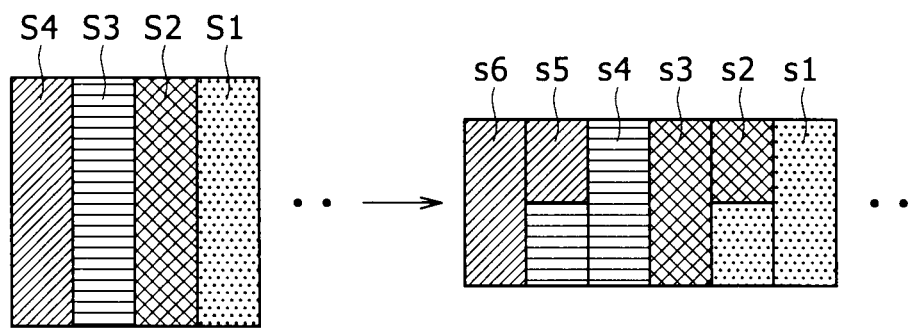
FIG. 2 is a diagrammatic view illustrating an example of rearrangement of transmission data.

FIG. 2 illustrates an example of rearrangement of transmission data.

Four vertically elongated blocks shown on the left side in FIG. 2 represent symbols S1 to S4 each in the form of data of 12 bits. The vertical length of the blocks represents 12 bits.

For example, if the symbols S1 to S4 are inputted as transmission data, then the rearrangement processing section 22 collects every 8 bits in the inputted order and rearranges the symbols S1 to S4 into symbols s1 to s6 which are data of a unit of 8 bits as indicated ahead of an arrow mark in FIG. 2.

The symbol s1 is configured from 8 bits from the first bit to the eighth bit of the symbol S1. The symbol s2 is configured from 8 bits including 4 bits from the ninth bit to the 12th bit of the symbol S1 and 4 bits from the first bit to the fourth bit of the symbol S2.

The symbol s3 is configured from 8 bits from the fifth bit to the 12th bit of the symbol S2. The symbol s4 is configured from 8 bits from the first bit to the eighth bit of the symbol S3. The symbol s5 is configured from 8 bits including 4 bits from the ninth bit to the 12th bit of the symbol S3 and 4 bits from the first bit to the fourth bit of the symbol S4. The symbol s6 is configured from 8 bits from the fifth bit to the 12th bit of the symbol S4.

Each of the symbols which configure transmission data is sometimes represented by a bit number different from 12. The rearrangement processing section 22 carries out a process of rearranging transmission data into data of a unit of 8 bits so that, in whichever bit number each symbol of transmission data is represented, a transmission frame can be produced by the same process by a processing section at a succeeding stage. The rearrangement processing section 22 outputs transmission data of a unit of 8 bits obtained by the rearrangement to the ECC processing section 23.

The ECC processing section 23 calculates an error correction code to be used for error correction of transmission data of a unit of 8 bits supplied thereto from the rearrangement processing section 22 based on the transmission data. Further, the ECC processing section 23 adds a parity which is the error correction code determined by the calculation to the transmission data to carry out error correction coding. For example, the Reed Solomon code is used as the error correction code.

Figure 3:
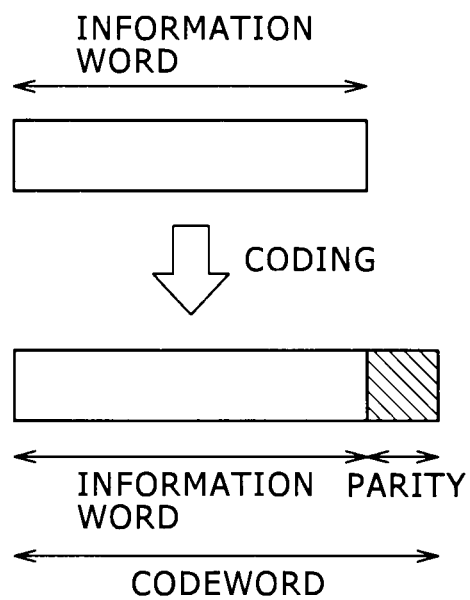
FIG. 3 is a diagrammatic view illustrating an example of error correction coding.

FIG. 3 illustrates an example of error correction coding by the ECC processing section 23.

The ECC processing section 23 applies a predetermined number of transmission data of a unit of 8 bits as an information word to a generating polynomial to carry out calculation of a parity. For example, also the parity determined by the ECC processing section 23 is data of a unit of 8 bits. The ECC processing section 23 adds the parity determined by the calculation to the information word as indicated ahead of a solid-white arrow mark to produce a codeword. The ECC processing section 23 outputs the coded data which are the data of the produced codeword in a unit of 8 bits to the division section 24.

The division section 24 allocates the coded data of a unit of 8 bits supplied thereto from the ECC processing section 23 successively to the transmission lines C1 to C4 beginning with the top data to carry out transmission line division. The division section 24 carries out the transmission line division such that, when certain coded data is allocated to the transmission line C4, succeeding coded data are successively allocated to the transmission lines beginning with the transmission line C1.

FIG. 4 illustrates an example of transmission line division.

Referring to FIG. 4, each of blocks denoted by numerals represents transmission data or a parity of a unit of 8 bits. One codeword is configured from data of 24 bits of the blocks 1 to 3, blocks 4 to 6, blocks 7 to 9 and blocks 10 to 12, and the coded data of the blocks 1 to 12 are supplied in order.

In this instance, the division section 24 allocates the coded data supplied thereto from the ECC processing section 23 in the supplied order to the transmission lines C1 to C4 such that those coded data which configure the same codeword may not be transmitted using the same transmission line. In the example of FIG. 4, the coded data of the blocks 1, 2 and 3 which configure the codeword 1 are allocated to the transmission lines C1, C2 and C3, respectively, and the coded data of the blocks 4, 5 and 6 which configure the codeword 2 are allocated to the transmission lines C4, C1 and C2, respectively. Further, the coded data of the blocks 7, 8 and 9 which configure the codeword 3 are allocated to the transmission lines C3, C4 and C1, respectively, and the coded data of the blocks 10, 11 and 12 which configure the codeword 4 are allocated to the transmission lines C2, C3, and C4, respectively.

The coded data of the blocks 1, 5 and 9 allocated to the transmission line C1 are supplied in this order to the framing section 31-1, and the coded data of the blocks 2, 6 and 10 allocated to the transmission line C2 are supplied in this order to the framing section 31-2. Further, the coded data of the blocks 3, 7 and 11 allocated to the transmission line C3 are supplied in this order to the framing section 31-3, and the coded data of the blocks 4, 8 and 12 allocated to the transmission line C4 are supplied in this order to the framing section 31-4.

Figure 5:
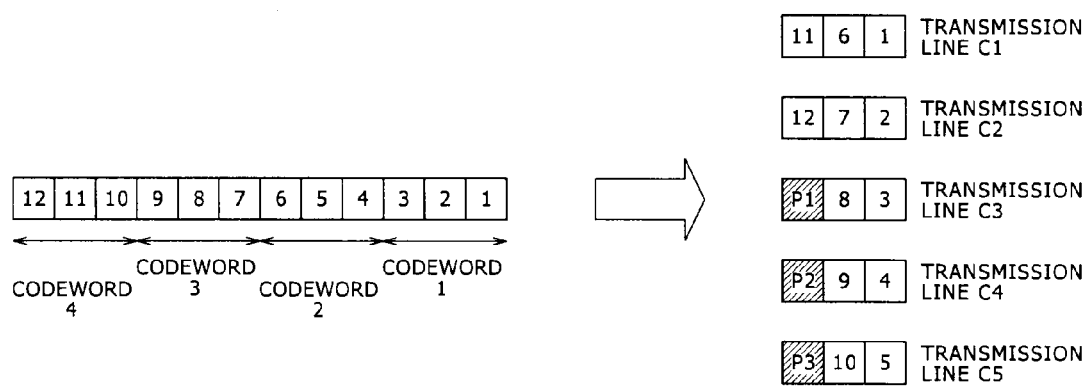
FIG. 5 is a diagrammatic view illustrating another example of transmission line division of transmission data.

FIG. 5 illustrates another example of transmission line division.

Allocation of the blocks 1 to 12 described hereinabove with reference to FIG. 4 to five transmission lines C1 to C5 is described with reference to FIG. 5. The transmission line division illustrated in FIG. 5 is carried out in the case where the transmission side block 11 and the reception side block 12 are connected to each other by five transmission lines.

Also in this instance, the division section 24 allocates coded data supplied from the ECC processing section 23 in the supplied order to the transmission lines C1 to C5 such that those coded data which configure the same codeword may not be transmitted using the same transmission line similarly. In the example of FIG. 5, coded data of the blocks 1, 2 and 3 which configure the codeword 1 are allocated to the transmission lines C1, C2 and C3, respectively, and coded data of the blocks 4, 5 and 6 which configure the codeword 2 are allocated to the transmission lines C4, C5 and C1, respectively. Further, coded data of the blocks 7, 8 and 9 which configure the codeword 3 are allocated to the transmission lines C2, C3 and C4, respectively, and coded data of the blocks 10, 11 and 12 which configure the codeword 4 are allocated to the transmission lines C5, C1 and C2, respectively After all coded data are allocated to the transmission lines, the division section 24 allocates padding data to each of those transmission lines to which a smaller amount of coded data is allocated so that the data amounts of the coded data allocated to all transmission lines may be equal to each other. Also the padding data is 8-bit data and has a predetermined value such as "00000000."

In the example of FIG. 5, one padding data is applied to the transmission lines C3, C4 and C5 to which a smaller amount of coded data is allocated. In FIG. 5, a block indicated by slanting lines represents padding data.

The coded data of the blocks 1, 6 and 11 allocated to the transmission line C1 are supplied in this order to the framing section 31-1, and the coded data of the blocks 2, 7 and 12 allocated to the transmission line C2 are supplied in this order to the framing section 31-2. The coded data of the blocks 3 and 8 allocated to the transmission line C3 and the padding data P1 allocated to the transmission line C3 next to the coded data of the block 8 are supplied in this order to the framing section 31-3. The coded data of the blocks 4 and 9 allocated to the transmission line C4 and the padding data P2 allocated to the transmission line C4 next to the coded data of the block 9 are supplied in this order to the framing section 31-4. The coded data of the blocks 5 and 10 allocated to the transmission line C5 and the padding data P3 allocated to the transmission line C5 next to the coded data of the block 10 are supplied in this order to a transmission processing section not shown which carries out processing of data transmitted thereto from the transmission line C5.

In the case where the data amounts of coded data allocated to the individual transmission lines are different in this manner, the padding data is applied by the division section 24. The number or bit number of all padding data to be allocated is equal to a number obtained by subtracting the remainder when the number of coded data is divided by the number of transmission lines from the number of transmission lines. Since the sizes of data allocated to the transmission lines are made equal to each other in this manner, it is possible to establish synchronism among processes to be carried out in parallel by the transmission processing sections 25-1 to 25-4.

The framing section 31-1 of the transmission section 25-1 produces a packet by placing coded data supplied thereto from the division section 24 into the payload and adding a header and a footer regarding transmission data to the payload. In the case where the padding data is allocated to the transmission line C1, the framing section 31-1 also places the padding data into the payload similarly to the coded data.

Further, the framing section 31-1 adds a start code representative of a start position of packet data to the top of the packet and adds an end code representative of an end position of the packet data to the tail end of the packet to produce a transmission frame.

Figure 6:
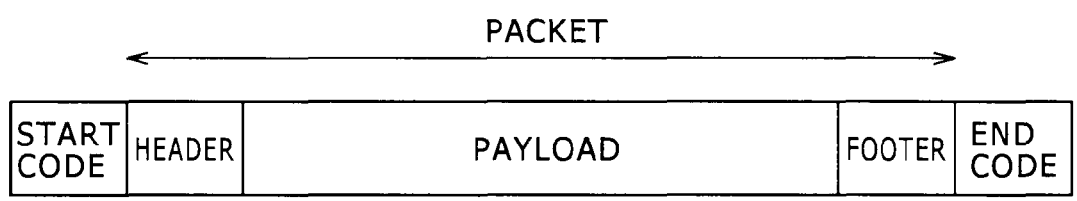
FIG. 6 is a diagrammatic view illustrating a frame configuration of a transmission frame.

FIG. 6 illustrates a frame configuration of a transmission frame.

Referring to FIG. 6, a header and a footer are added to a payload, in which coded data are placed, to configure one packet. Further, a start code and an end code are added to the packet to configure a transmission frame.

The framing section 31-1 outputs the frame data, which are data of a transmission frame having such a frame configuration as illustrated in FIG. 6, to the modulation section 32-1 in order beginning with the top data.

The modulation section 32-1 modulates the frame data supplied thereto from the framing section 31-1 in accordance with a predetermined method and outputs the frame data after the modulation to the DAC 33-1.

The DAC 33-1 carries out D/A conversion for the frame data supplied thereto from the modulation section 32-1 and outputs an analog signal obtained by the D/A conversion to the transmission amplifier 34-1.

The transmission amplifier 34-1 adjusts the signal voltage of the signal supplied thereto from the DAC 33-1 and transmits the signal after the adjustment to the reception side block 12 through the transmission line C1.

Also in the transmission processing sections 25-2 to 25-4, processes similar to those carried out by the components of the transmission processing section 25-1 are carried out. In particular, the transmission processing section 25-2 carries out framing, modulation and D/A conversion for coded data allocated to the transmission line C2 and transmits a signal representative of frame data through the transmission line C2. Meanwhile, the transmission processing section 25-3 carries out framing, modulation and D/A conversion for coded data allocated to the transmission line C3 and transmits a signal representative of frame data through the transmission line C3. Further, the transmission processing section 25-4 carries out framing, modulation and D/A conversion for coded data allocated to the transmission line C4 and transmits a signal representative of frame data through the transmission line C4.

Configuration of Reception Side Block

Now, a configuration of the reception side block 12 is described. Referring to FIG. 1, the reception side block 12 includes reception processing sections 51-1 to 51-4, a coupling section 52, an ECC processing section 53, a rearrangement processing section 54 and a signal processing section 55.

The reception processing section 51-1 includes a reception amplifier 61-1, a clock reproduction section 62-1, an ADC (Analog Digital Converter) 63-1, a demodulation section 64-1 and a frame synchronization section 65-1. The reception processing section 51-2 includes a reception amplifier 61-2, a clock reproduction section 62-2, an ADC 63-2, a demodulation section 64-2 and a frame synchronization section 65-2. The reception processing section 51-3 includes a reception amplifier 61-3, a clock reproduction section 62-3, an ADC 63-3, a demodulation section 64-3 and a frame synchronization section 65-3. The reception processing section 51-4 includes a reception amplifier 61-4, a clock reproduction section 62-4, an ADC 63-4, a demodulation section 64-4 and a frame synchronization section 65-4.

A signal transmitted from the transmission amplifier 34-1 of the transmission side block 11 is inputted to the reception amplifier 61-1, and a signal transmitted from the transmission amplifier 34-2 is inputted to the reception amplifier 61-2. A signal transmitted from the transmission amplifier 34-3 is inputted to the reception amplifier 61-3, and a signal transmitted from the transmission amplifier 34-4 is inputted to the reception amplifier 61-4.

If a configuration nearer to a transmission line is regarded as a lower order configuration in this manner, then the coupling section 52 is provided at a position lower than the ECC processing section 53 in the reception side block 12. Further, a reception processing section having a reception amplifier, a clock reproduction section, an ADC, a demodulation section and a frame synchronization section is provided in a corresponding relationship to each of the transmission lines C1 to C4 at a position lower than the coupling section 52.

The reception amplifier 61-1 of the reception processing section 51-1 receives a signal transmitted thereto from the transmission side block 11, adjusts the signal voltage of the received signal and outputs the signal of the adjusted signal voltage. The signal outputted from the reception amplifier 61-1 is inputted to the clock reproduction section 62-1 and the ADC 63-1.

The clock reproduction section 62-1 detects an edge of the input signal to establish bit synchronism and reproduces a clock signal based on a detection period of the edge. The clock reproduction section 62-1 outputs the reproduced clock signal to the ADC 63-1.

The ADC 63-1 carries out sampling of the input signal in accordance with the clock signal reproduced by the clock reproduction section 62-1 and outputs frame data obtained by the sampling to the demodulation section 64-1.

The demodulation section 64-1 carries out demodulation of the frame data by a method corresponding to the modulation method used by the modulation section 32-1 of the transmission side block 11 and outputs the frame data after the demodulation to the frame synchronization section 65-1.

The frame synchronization section 65-1 detects a start code and an end code from the frame data supplied thereto from the demodulation section 64-1 to establish frame synchronism. The frame synchronization section 65-1 detects data from the start code to the end code as packet data and outputs coded data placed in the payload of the packet data to the coupling section 52.

Also the reception processing sections 51-2 to 51-4 carry out similar processes to those carried out by the components of the reception processing section 51-1. In particular, the reception processing section 51-2 carries out sampling of a signal transmitted thereto through the transmission line C2, demodulation of frame data obtained by the sampling and frame synchronization and outputs coded data to the coupling section 52. The reception processing section 51-3 carries out sampling of a signal transmitted thereto through the transmission line C3, demodulation of frame data obtained by the sampling and frame synchronization and outputs coded data to the coupling section 52. Further, the reception processing section 51-4 carries out sampling of a signal transmitted thereto through the transmission line C4, demodulation of frame data obtained by the sampling and frame synchronization and outputs coded data to the coupling section 52.

The coupling section 52 rearranges the coded data supplied thereto from the reception processing sections 51-1 to 51-4 in an order reverse to the allocation order of the coded data to the transmission lines by the division section 24 of the transmission side block 11 to carry out transmission line coupling or integration.

Figure 7:
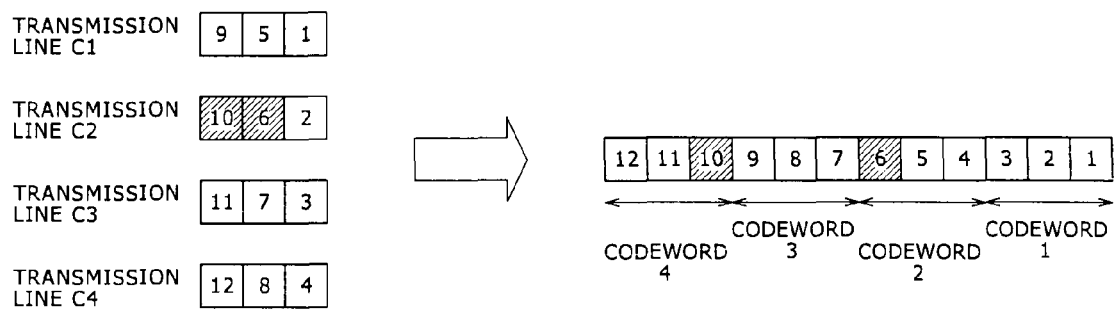
FIG. 7 is a diagrammatic view illustrating transmission line coupling of transmission data.

FIG. 7 illustrates an example of transmission line coupling.

It is assumed that transmission line division of coded data of the blocks 1 to 12 is carried out in such a manner as described hereinabove with reference to FIG. 4. In this instance, the coupling section 52 rearranges the coded data in the reverse order to the allocation order of the coded data to the transmission line upon transmission line division to produce coded data of a sequence same as that in the output order of the coded data from the ECC processing section 23 as indicated ahead of a solid-white arrow mark in FIG. 7. The coupling section 52 successively outputs the coded data of the blocks 1 to 12, which configure each codeword produced by carrying out the rearrangement, to the ECC processing section 53.

In the case where padding data is supplied from the reception processing sections 51-1 to 51-4 following coded data, the coupling section 52 removes the padding data and outputs only the coded data.

The ECC processing section 53 carries out error correction arithmetic operation based on the parity included in the coded data supplied thereto from the coupling section 52 to detect an error of the transmission data and carries out correction of the detected error.

Figure 8:
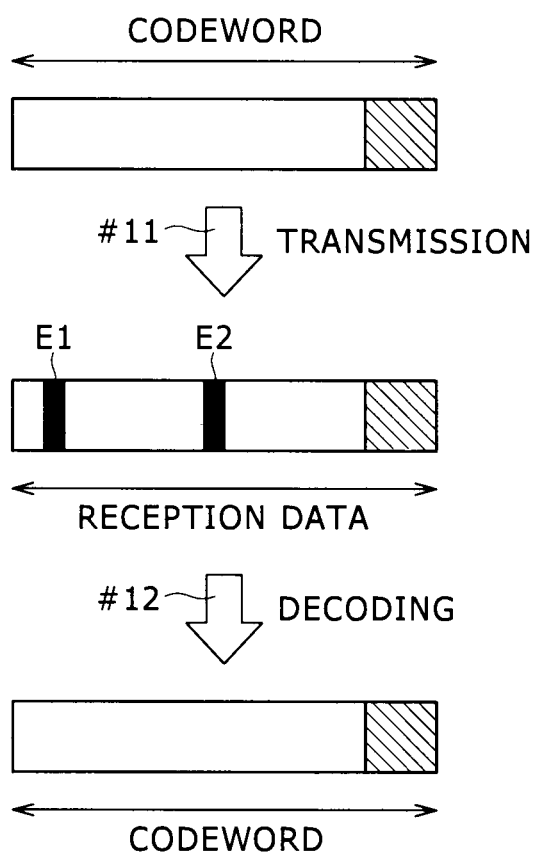
FIG. 8 is a diagrammatic view illustrating an example of error correction decoding.

FIG. 8 illustrates an example of error correction decoding by the ECC processing section 53.

For example, it is assumed that data of a codeword illustrated at the upper stage in FIG. 8 are transmitted as coded data from the transmission side block 11 and such data as indicated ahead of a solid-white arrow mark #11 are received. Bits E1 and E2 in the reception data of FIG. 8 are error bits.

In this instance, the ECC processing section 53 carries out error detection arithmetic operation based on the parity to detect the bits E1 and E2 and corrects the bits E1 and E2 as indicated ahead of a solid-white arrow mark #12. The ECC processing section 53 carries out error correction decoding for each codeword and outputs the transmission data after the error correction to the rearrangement processing section 54.

The rearrangement processing section 54 rearranges the transmission data of a unit of 8 bits supplied thereto from the ECC processing section 53 in the reverse order to the rearrangement order by the rearrangement processing section 22 of the transmission side block 11. In particular, the rearrangement processing section 54 carries out reverse processing to the processing described hereinabove with reference to FIG. 2 to convert the transmission data of a unit of 8 bits into transmission data of a unit of a predetermined bit number such as 12 bits. The rearrangement processing section 54 outputs the transmission data obtained by the rearrangement to the signal processing section 55.

The signal processing section 55 uses the transmission data supplied thereto from the rearrangement processing section 54 to carry out various processes. For example, if the transmission data are pixel data which configure an image, then the signal processing section 55 produces an image of one frame based on the pixel data and carries out various processes such as compression of the image data, display of an image and recording of the image data into a recording medium.

Operation of Blocks

Figure 9:
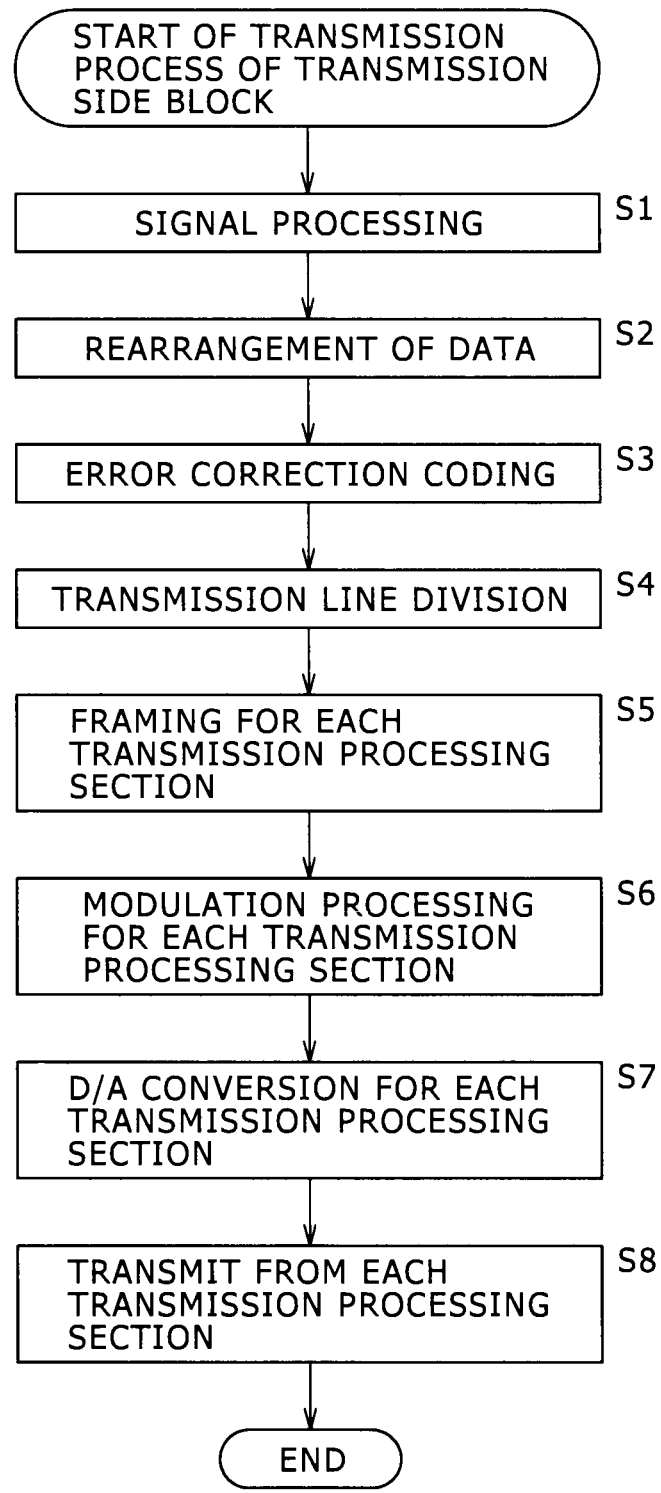
FIG. 9 is a flow chart illustrating a transmission process of a transmission side block.

Here, a series of processes of the transmission side block 11 and the reception side block 12 are described. First, a transmission process of the transmission side block 11 is described with reference to a flow chart of FIG. 9.

At step S1, the signal processing section 21 carries out signal processing and outputs transmission data obtained by the signal processing.

At step S2, the rearrangement processing section 22 acquires the transmission data supplied thereto from the signal processing section 21 and carries out rearrangement of the data in such a manner as described hereinabove with reference to FIG. 2.

At step S3, the ECC processing section 23 calculates a parity based on the transmission data of a unit of 8 bits obtained by the rearrangement and adds the parity to the transmission data to carry out error correction coding.

At step S4, the division section 24 carries out transmission line division of the coded data obtained by the error correction coding. The processes at steps S5 to S8 are repeated in parallel by the transmission processing sections 25-1 to 25-4.

In particular, at step S5, the framing sections 31-1 to 31-4 individually place the coded data obtained by the error correction coding into the payload and add a header and a footer to produce a packet. Further, the framing sections 31-1 to 31-4 add a start code to the top of the packet and adds an end code to the tail end of the packet to carry out framing of the packet.

At step S6, the modulation sections 32-1 to 32-4 individually carry out a modulation process for frame data which configure the transmission frames obtained by the framing.

At step S7, the DACs 33-1 to 33-4 carry out D/A conversion for the frame data obtained by the modulation process.

At step S8, the transmission amplifiers 34-1 to 34-4 individually transmit the signals obtained by the D/A conversion to the reception side block 12. The processes at steps S2 to S8 are carried out repetitively for all transmission data outputted from the signal processing section 21 and end when the processes for all transmission data end.

Figure 10:
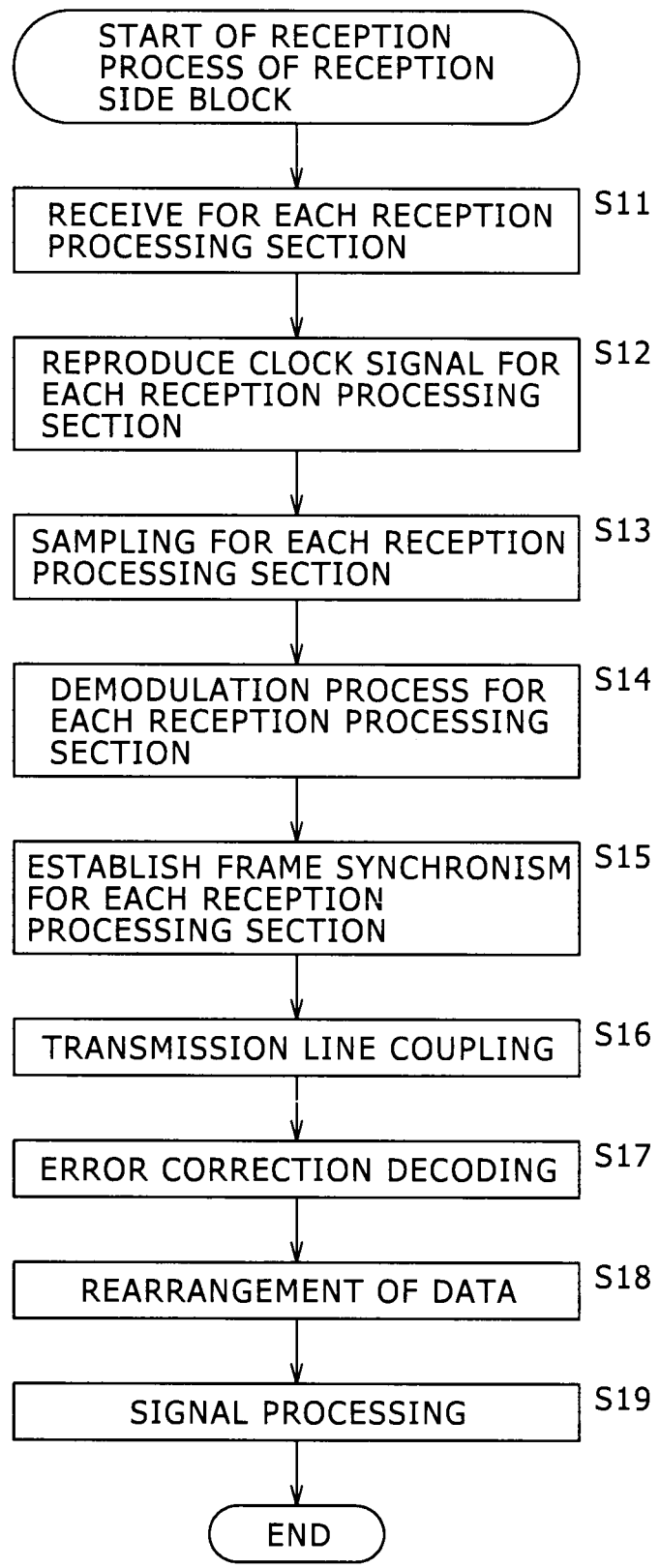
FIG. 10 is a flow chart illustrating a reception process of a reception side block.

Now, a reception process of the reception side block 12 is described with reference to a flow chart of FIG. 10.

Processes at steps S11 to S15 are carried out in parallel by the reception processing sections 51-1 to 51-4. In particular, at step S11, the reception amplifiers 61-1 to 61-4 individually receive signals transmitted thereto from the transmission side block 11 and adjust the signal voltage of the received signals.

At step S12, the clock reproduction sections 62-1 to 62-4 individually detect an edge of the signals supplied thereto from the reception amplifiers 61-1 to 61-4, respectively, to reproduce a clock signal.

At step S13, the ADCs 63-1 to 63-4 carry out sampling in accordance with the clock signals reproduced by the clock reproduction sections 62-1 to 62-4, respectively.

At step S14, the demodulation sections 64-1 to 64-4 carry out a demodulation process for frame data obtained by the sampling.

At step S15, the frame synchronization sections 65-1 to 65-4 detect a start code and an end code from the frame data supplied thereto from the demodulation sections 64-1 to 64-4, respectively, to establish frame synchronism. The frame synchronization sections 65-1 to 65-4 output coded data placed in the payload to the coupling section 52.

At step S16, the coupling section 52 rearranges the coded data supplied thereto from the frame synchronization sections 65-1 to 65-4 in the reverse order to the allocation order of the coded data to the transmission lines upon transmission line division to carry out a transmission line coupling.

At step S17, the ECC processing section 53 carries out error correction decoding based on the parity included in the codeword configured from the coded data to correct an error of the transmission data.

At step S18, the rearrangement processing section 54 carries out rearrangement of the transmission data after the error correction to produce transmission data of a unit of a predetermined number of bits same as that of the data outputted from the signal processing section 21 in the transmission side block 11. The processes at steps S11 to S18 are carried out repetitively until the processing for the signals transmitted from the transmission side block 11 is ended.

When the processing for the signals transmitted from the transmission side block 11 ends, the signal processing section 55 carries out signal processing based on the transmission data supplied thereto from the rearrangement processing section 54 at step S19. When the signal processing ends, the signal processing section 55 ends the processing.

In this manner, in the transmission system 1, an error of transmission data which appears on a transmission line is corrected using an error correction code added to the transmission data. Consequently, when an error of transmission data appears, there is no necessity to issue a request to re-send the transmission data to the transmission side block 11, and therefore, the real time property of data transmission can be assured while an error countermeasure is assured. Further, since there is no necessity to provide a transmission line for a re-sending request, simplification in circuit configuration and reduction in cost can be anticipated. Further, since the circuit configuration can be simplified, also the power consumption can be reduced.

Further by dividing coded data and carrying out processes after the division in parallel and then transmitting the coded data in parallel using a plurality of transmission lines, high speed data transmission can be achieved.

Further, by carrying out transmission line division/coupling at a position lower than the ECC processing section, it is necessary for one ECC processing section to be provided in each of the transmission side block 11 and the reception side block 12, resulting in reduction of the circuit scale.

For example, if transmission line division is carried otherwise at a position higher than the ECC processing section which carries out error correction coding, then it is necessary to prepare a number of ECC processing sections equal to the number of transmission lines, resulting in increase of the circuit scale of the transmission side block 11. However, such a situation as just described can be prevented. Further, if transmission line coupling is carried out otherwise at a position higher than the ECC processing section which carries out error detection decoding, then it is necessary to prepare a number of ECC processing sections equal to the number of transmission lines, resulting in increase of the circuit scale of the reception side block 12. However, such a situation as just described can be prevented.

Figure 11:
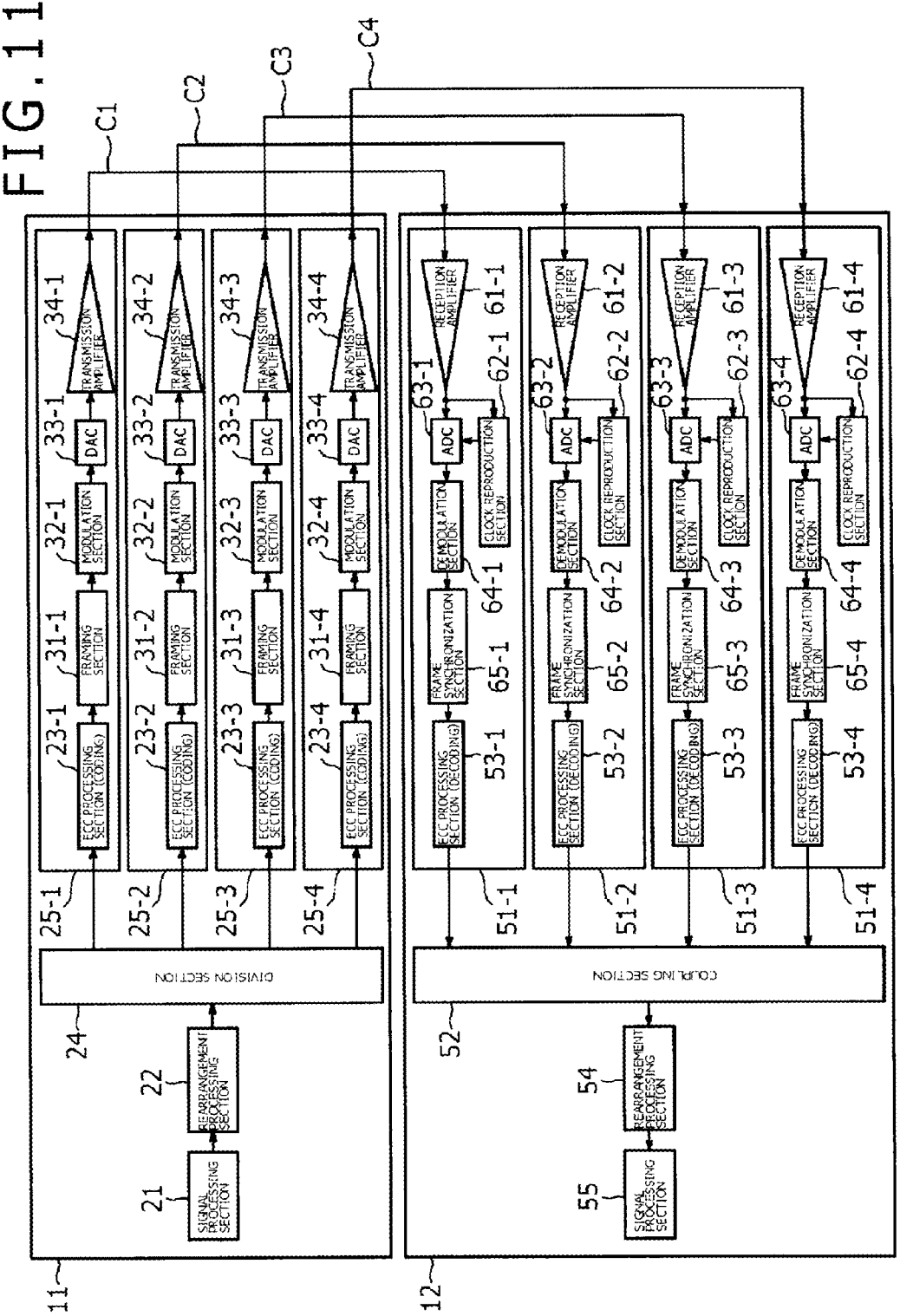
FIG. 11 is a block diagram showing a modification to the transmission system.

A configuration of the transmission side block 11 which carries out error correction coding after transmission line division and a configuration of the reception side block 12 which carries out error correction decoding before transmission line coupling are shown in FIG. 11. In the transmission side block 11 of FIG. 11, a number of ECC processing sections 23-1 to 23-4 equal to the number of transmission lines are provided at a position lower than the division section 24. Further, in the reception side block 12, a number of ECC processing sections 53-1 to 53-4 equal to the number of transmission lines are provided at a position lower than the coupling section 52.

Further, by carrying out error correction coding before transmission line division and transmitting coded data which configure the same codeword through different transmission lines, burst errors, that is, successive errors, appearing in a transmission line can be dispersed into the codeword after the decoding. Consequently, the error correction capacity can be improved.

For example, a case is studied in which burst errors of 2 bytes appear in the transmission line C2 as indicated on the left side in FIG. 7. The coded data of the block 6 and the coded data of the block 10 successively transmitted along the transmission line C2 have errors. Among the blocks shown in FIG. 7, each block indicated by slanting lines represents a block of coded data which suffer from an error, and each block indicated by no slanting line represents a block of coded data which does not suffer from an error.

In this instance, in the coded data after the transmission line coupling, the coded data of the block 6 and the coded data of the block 10 transmitted through the transmission line C2 are dispersed into different codewords as indicated ahead of a solid-white arrow mark in FIG. 7. Generally, most of error correction codes are vulnerable to burst errors. For example, in the case of the Reed Solomon code, since the number of errors which can be corrected per one codeword is determined, if it is possible to disperse burst errors, which are concentrated upon one codeword, between different codewords, then the error correction capacity can be enhanced.

Example of Configuration of Computer

While the series of processes described above can be executed by hardware, it may otherwise be executed by software. In the case where the series of processes is executed by software, a program which constructs the software is installed from a program recording medium into a computer incorporated in hardware for exclusive use, a personal computer for universal use, and so forth.

Figure 12:
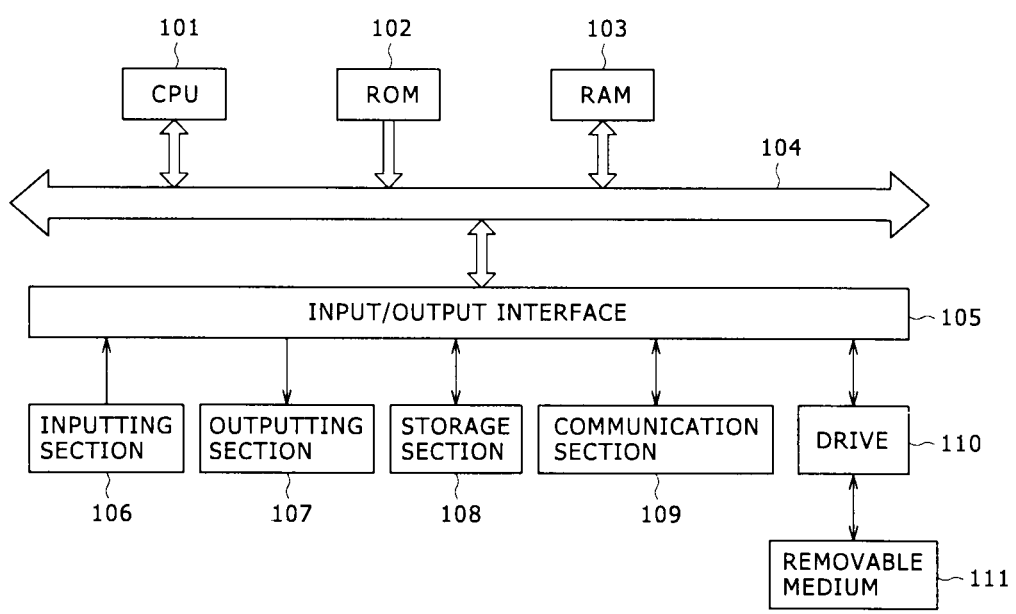
FIG. 12 is a block diagram showing an example of a configuration of a computer.

FIG. 12 shows an example of a hardware configuration of a computer which executes the series of processes described hereinabove in accordance with a program.

Referring to FIG. 12, in the computer shown, a central processing unit (CPU) 101, a read only memory (ROM) 102 and a random access memory (RAM) 103 are connected to one another by a bus 104.

Further, an input/output interface 105 is connected to the bus 104. An inputting section 106 including a keyboard, a mouse and so forth, and an outputting section 107 including a display unit, a speaker and so forth are connected to the input/output interface 105. Also, a storage section 108 formed from a hard disk, a nonvolatile memory, or the like, a communication section 109 formed from a network interface or the like, and a drive 110 for driving a removable medium 111 are connected to the input/output interface 105.

In the computer configured in such a manner as described above, the CPU 101 loads a program stored, for example, in the storage section 108 into the RAM 103 through the input/output interface 105 and the bus 104 and executes the program to carry out the series of processes described above.

The program to be executed by the CPU 101 can be recorded on, for example, a removable medium 111 or can be provided through a wire or wireless transmission medium such as a local area network, the Internet or a digital broadcast, and installed into the storage section 108.

It is to be noted that the program to be executed by the computer may be of the type by which the processes are carried out in a time series in the order as described in the present specification or of the type by which the processes are executed in parallel or executed individually at necessary timings such as when the process is called.

While a preferred embodiment of the disclosed technology has been described using specific terms, such description is for illustrative purpose only, and it is to be understood that changes and variations may be made without departing from the spirit or scope of the following claims.

The present disclosure contains subject matter related to that disclosed in Japanese Priority Patent Application JP 2010-258570 filed in the Japan Patent Office on Nov. 19, 2010, the entire content of which is hereby incorporated by reference.

What is claimed is:

1. A transmission apparatus, comprising:
an error correction code calculation section operable to calculate an error correction code from data of a transmission object as an information word, wherein a codeword is obtained based on the error correction code and wherein the codeword comprises a plurality of coded data;
a division section operable to allocate the plurality of coded data to a plurality of transmission lines; and
a plurality of transmission sections, corresponding to the plurality of transmission lines, wherein each transmission section of the plurality of transmission sections transmits the allocated plurality of coded data to a reception apparatus through the corresponding plurality of transmission lines.

2. The transmission apparatus according to claim 1, wherein
the division section is operable to allocate padding data, having a predetermined value, to a transmission line of the plurality of transmission lines to which the plurality of coded data are allocated by a smaller amount than the other transmission lines of the plurality of transmission lines, so that an amount of the allocated plurality of coded data is equal for each transmission line of the plurality of transmission lines and wherein the plurality of transmission sections are operable to transmit the padding data next to the allocated plurality of coded data.

3. The transmission apparatus according to claim 2, wherein the division section is operable to allocate the plurality of coded data which configure the same codeword to different transmission lines of the plurality of transmission lines in an order in which the plurality of coded data are supplied from the error correction code calculation section.

4. The transmission apparatus according to claim 1, wherein the error correction code is added to the data of the transmission object to obtain the codeword.

5. The transmission apparatus according to claim 1, further comprising signal processing section operable to process the data of the transmission object and rearrangement processing section operable to rearrange the processed data of the transmission object and provide the rearranged data of the transmission object to the error correction code calculation section.

6. The transmission apparatus according to claim 5, wherein the data of the transmission object comprises one or more of: image data, text data, and audio data.

7. The transmission apparatus according to claim 5, wherein the rearrangement processing section is operable to rearrange a plurality of bits in the processed data of the transmission object.

8. The transmission apparatus according to claim 1, wherein the error correction code comprises a parity.

9. The transmission apparatus according to claim 8, wherein the error correction code calculation section is operable to apply the data of the transmission object to a polynomial to calculate the parity.

10. The transmission apparatus according to claim 1, wherein the error correction code comprises a Reed-Solomon code.

11. The transmission apparatus according to claim 1, wherein each of the plurality of transmission sections comprises:

a framing section operable to produce a packet that comprises a payload, a header, a footer, a start code, and an end code, wherein the plurality of coded data is placed in the payload;

a modulation section operable to modulate the packet;

a digital to analog converter section operable to perform digital to analog conversion of the modulated packet; and a transmission amplifier operable to adjust signal voltage of the converted packet and transmit the adjusted packet to the reception apparatus through the plurality of transmission lines.

12. A transmission method, the method comprising:

calculating an error correction code from data of a transmission object as an information word;

obtaining a codeword based on the error correction code, wherein the codeword comprises a plurality of coded data;

allocating the plurality of coded data to a plurality of transmission lines; and transmitting the allocated plurality of coded data to a reception apparatus through each corresponding transmission line of the plurality of transmission lines.

13. A non-transitory computer readable medium having stored thereon, a computer program having at least one code section executable by a computer, thereby causing the computer to perform the steps comprising:

calculating an error correction code from data of a transmission object as an information word;

obtaining a codeword based on the error correction code, wherein the codeword comprises a plurality of coded data;

allocating the plurality of coded data to a plurality of transmission lines; and transmitting the allocated plurality of coded data to a reception apparatus through each corresponding transmission line of the plurality of transmission lines.

14. A reception apparatus, comprising:

a plurality of reception sections provided corresponding to a plurality of transmission lines and operable to receive a plurality of coded data transmitted from a transmission apparatus, wherein the transmission apparatus is operable to:

calculate an error correction code from data of a transmission object as an information word, obtain a codeword based on the error correction code, wherein the codeword comprises a plurality of coded data, allocate the plurality of coded data to the plurality of transmission lines, and transmit the allocated plurality of coded data to each corresponding transmission line of the plurality of transmission lines;

a coupling section operable to produce the codeword based on the received plurality of coded data; and an error correction section operable to carry out error correction of the data of the transmission object based on the error correction code included in the codeword.

15. The reception apparatus according to claim 14, wherein the plurality of reception sections are operable to receive padding data with the received plurality of coded data, wherein the transmission apparatus is operable to allocate the padding data, having a predetermined value, to a transmission line of the plurality of transmission lines to which the plurality of coded data are allocated by a smaller amount than the other transmission lines of the plurality of transmission lines, so that an amount of the allocated plurality of coded data is equal for each transmission line of the plurality of transmission lines and wherein the coupling section is operable to remove the padding data.

16. The reception apparatus according to claim 14, wherein each of the plurality of reception sections comprises:

a reception amplifier operable to adjust signal voltage of the received plurality of coded data;

a clock reproduction section operable to detect an edge of the adjusted signal voltage of the received plurality of coded data to establish bit synchronism and reproduce a clock signal based on the detection of the edge;

an analog to digital converter section operable to sample the adjusted signal voltage of the received plurality of coded data in accordance with the reproduced clock signal;

a demodulation section operable to demodulate the sampled signal voltage of the received plurality of coded data; and a frame synchronization section operable to detect a start code and an end code from the demodulated signal voltage of the received plurality of coded data and detect the codeword from the start code to the end code.

17. The reception apparatus according to claim 14, wherein the coupling section is operable to rearrange the plurality of coded data in an order opposite to an order in which the plurality of coded data is allocated to the plurality of transmission lines in the transmission apparatus.

18. A reception method, comprising:
receiving a plurality of coded data transmitted from a transmission apparatus through a plurality of transmission lines, wherein the transmission apparatus is operable to:
calculate an error correction code from data of a transmission object as an information word,
obtain a codeword based on the error correction code, wherein the codeword comprises a plurality of coded data,
allocate the plurality of coded data to the plurality of transmission lines, and
transmit the allocated plurality of coded data to each corresponding transmission line of the plurality of transmission lines;
producing the codeword based on the received plurality of coded data; and
carrying out error correction of the data of the transmission object based on the error correction code included in the codeword.

19. A non-transitory computer readable medium having stored thereon, a computer program having at least one code section executable by a computer, thereby causing the computer to perform the steps comprising:
receiving a plurality of coded data transmitted from a transmission apparatus through a plurality of transmission lines, wherein the transmission apparatus is operable to:
calculate an error correction code from data of a transmission object as an information word,
obtain a codeword based on the error correction code, wherein the codeword comprises a plurality of coded data,
allocate the plurality of coded data to the plurality of transmission lines, and
transmit the allocated plurality of coded data to each corresponding transmission line of the plurality of transmission lines;
producing the codeword based on the received plurality of coded data; and
carrying out error correction of the data of the transmission object based on the error correction code included in the codeword.

20. A transmission system, comprising:
a transmission apparatus; and
a reception apparatus;
the transmission apparatus comprises:
an error correction code calculation section operable to calculate an error correction code from data of a transmission object as an information word, wherein a codeword is obtained based on the error correction code and wherein the codeword comprises a plurality of coded data,
a division section operable to allocate the plurality of coded data to a plurality of transmission lines, and
a plurality of transmission sections, corresponding to the plurality of transmission lines, wherein each transmission section of the plurality of transmission sections transmits the allocated plurality of coded data to a reception apparatus through the corresponding plurality of transmission lines, and
the reception apparatus comprises:
a plurality of reception sections provided corresponding to the plurality of transmission lines and operable to receive the plurality of coded data transmitted from the transmission apparatus,
a coupling section operable to produce the codeword based on the received plurality of coded data, and
an error correction section operable to carry out error correction of the data of the transmission object based on the error correction code included in the codeword.

* * * * *